June 21, 1960     H. T. HALL     2,941,248
HIGH TEMPERATURE HIGH PRESSURE APPARATUS
Filed Jan. 6, 1958     3 Sheets-Sheet 1
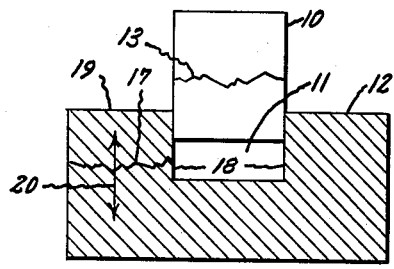
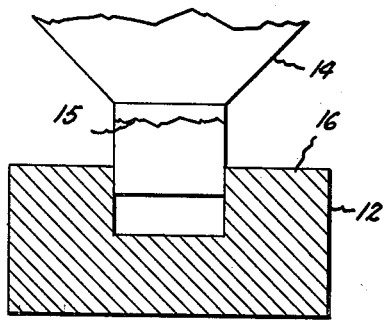
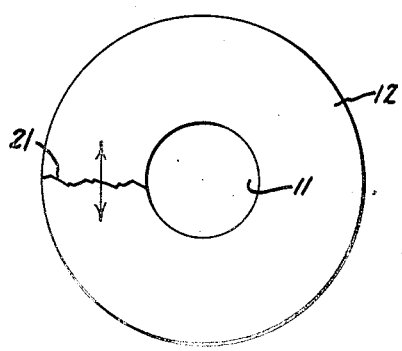
Inventor:
Howard Tracy Hall,
by Paul A. Frank
His Attorney.

June 21, 1960  H. T. HALL  2,941,248
HIGH TEMPERATURE HIGH PRESSURE APPARATUS
Filed Jan. 6, 1958  3 Sheets-Sheet 2
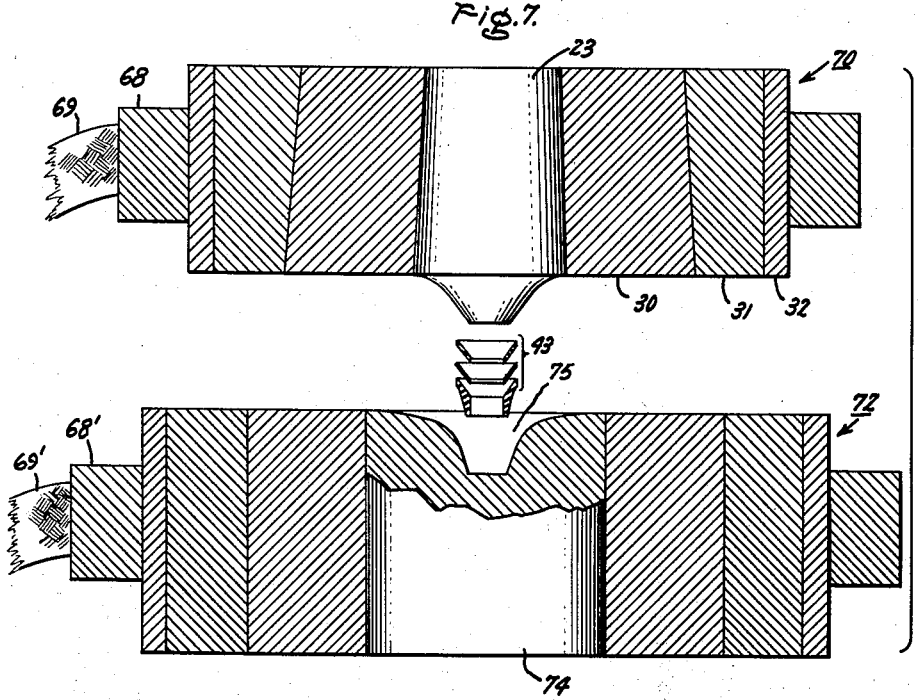
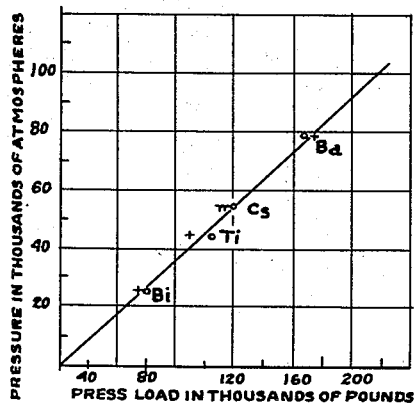
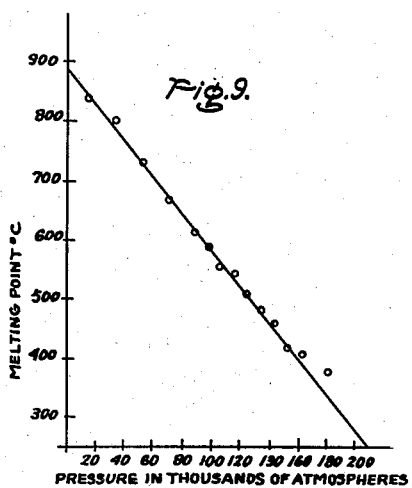
Inventor:
Howard Tracy Hall,
by Paul A. Frank
His Attorney.

June 21, 1960 H. T. HALL 2,941,248
HIGH TEMPERATURE HIGH PRESSURE APPARATUS
Filed Jan. 6, 1958 3 Sheets-Sheet 3
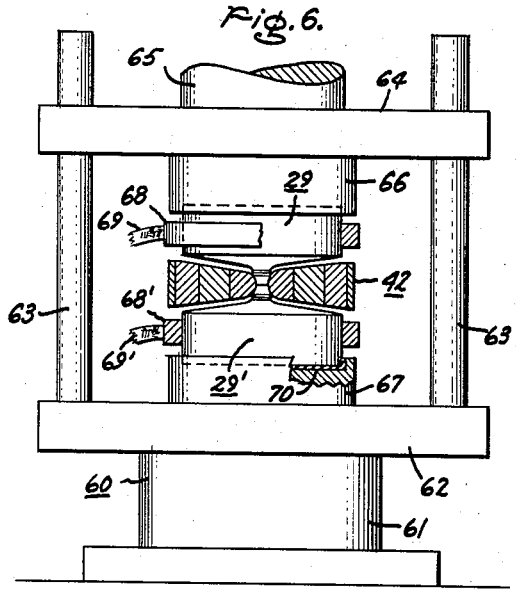
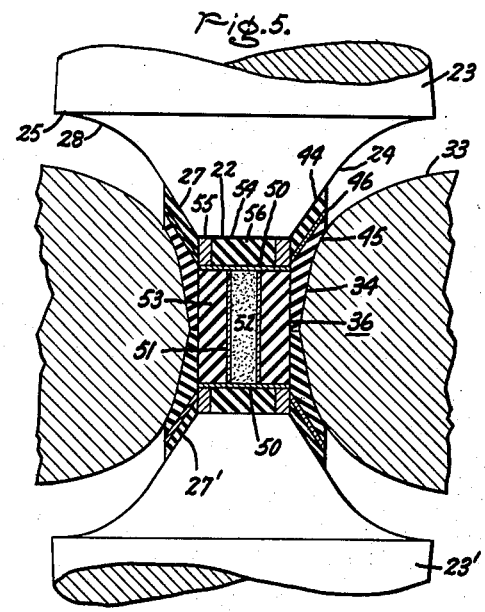
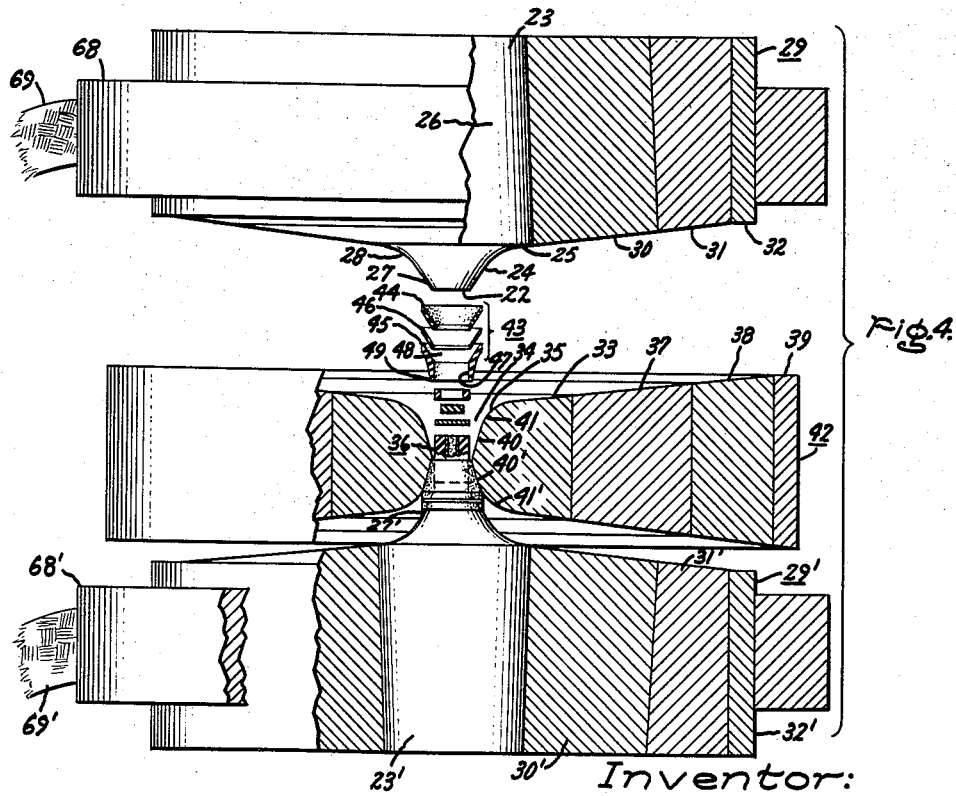
Inventor:
Howard Tracy Hall,
by Paul A. Frank
His Attorney.

United States Patent Office 2,941,248
Patented June 21, 1960

2,941,248

HIGH TEMPERATURE HIGH PRESSURE APPARATUS

Howard Tracy Hall, Provo, Utah, assignor to General Electric Company, a corporation of New York Filed Jan. 6, 1958, Ser. No. 707,432

11 Claims. (Cl. 18—16.5)

This invention relates to high temperature high pressure apparatus and specifically, to apparatus in which high temperatures and high pressures may be maintained for prolonged periods of time. This application is a continuation-in-part of my copending application, Serial No. 448,050, filed February 14, 1955, and assigned to the same assignee as the present invention.

An apparatus capable of producing temperatures of the order of several thousand degrees Centigrade and pressures of the order of 40,000 to 100,000 atmospheres for sustained time intervals is desirable to effect and control reactions occurring under such conditions. The reactions of various specimen materials subjected to such high pressures and high temperatures may be employed for research study purposes or to obtain physical and chemical changes which give added characteristics to given materials. An example of such a process of reaction is the transformation of carbonaceous materials to diamond under high pressures and temperatures. Pressures of the above order may cause explosive rupture of prior high pressure apparatus at room temperature, while tendency to rupture would be increased if the high pressure device were subjected also to temperatures of the mentioned range.

The invention of the present application provides an apparatus which produces concurrent high temperatures and high pressures of such orders for sustained time intervals without rupturing. The aforementioned pressures and particularly the combination of high pressures and high temperatures subject the apparatus to apparent stresses which greatly exceed what is usually considered the permissible or ultimate stresses of the sttrongest known structural materials. This apparatus is based on a new concept in the field of high pressures and high temperatures, including a novel design or geometry of parts embodying this concept.

Accordingly, it is an object of this invention to provide a new and improved high temperature high pressure apparatus.

It is another object of this invention to provide an improved apparatus which produces and maintains concurrent high temperature high pressure conditions.

It is a further object of this invention to provide an improved high temperature high pressure apparatus which effects and controls reactions at temperatures on the order of several thousand degrees Centigrade and pressures on the order of 40,000 to 100,000 atmospheres.

It is yet another object of this invention to provide a high pressure high temperature apparatus by which the process of transformation of carbonaceous materials to diamond may be accomplished.

It is still another object of this invention to provide a high pressure high temperature apparatus capable of repetitively sustaining high pressures and high temperatures.

In carrying out this invention in one form an annular pressure resisting member or die having a convergent divergent aperture therein is coaxially positioned between a pair of opposed tapered punches. A reaction vessel is placed in the convergent divergent aperture together with a gasket on each punch between the punch and the pressure resisting member. Movement of one of the punches develops approximately hydrostatic pressure in the reaction vessel with accompanying resolving of forces in the punches and the pressure resisting member.

These and various other objects, features and advantages of the invention will be better understood from the following description, taken in connection with the accompanying drawing, in which:

Fig. 1 is a diagrammatic illustration of a simple cylinder piston combination;

Fig. 2 is a diagrammatic illustration of an improved flared piston;

Fig. 3 is an illustration of a cylinder or die showing failure due to hoop tension;

Fig. 4 is an exploded sectional view of one form of my high temperature high pressure apparatus;

Fig. 5 is an enlarged sectional view of the reaction vessel and associated parts which are shown in Fig. 4;

Fig. 6 is a front elevational view of a hydraulic press with a high temperature high pressure apparatus which embodies this invention;

Fig. 7 is another modification of a punch and die arrangement embodying the principles of this invention;

Fig. 8 is a curve indicating pressure versus press load for given metal transitions; and Fig. 9 is a curve indicating pressure versus temperature for melting points of germanium.

Perhaps the simplest possible type of pressure chamber, exemplary of those employed in conjunction with well known and accepted high pressure high temperature practices, is a closed end cylinder or die with a cylindrical piston or punch capable of advancing into the open end of the cylinder, sealing in and compressing the contents therein. Such a device is diagrammatically illustrated in Fig. 1 by a punch or piston 10, adapted for reciprocatory motion within a chamber 11 of cylinder 12. Since the punch 10 is placed in simple axial compression, the maximum pressure which can be generated is limited by the compressive strength of the punch material. Such punches generally fail when the subjected compressive force is on the order of about 50,000 atmospheres with the hardest materials such as the cemented carbides, the general line of failure corresponding to that of the line 13 in Fig. 1. While punch 10 may be considerably strengthened by flaring as illustrated in Fig. 2 by flared portion 14, compressive failures along the line 15 as illustrated in Fig. 2 may repetitively occur. The necessity of having sufficient clearance between the flare 14 and the cylinder surface 16 in order to provide for proper stroke leaves a critical area in punch 10 between the flared portion 14 and surface 16 of cylinder 12.

High imposed stresses may also cause two types of cylinder or die failure. Referring again to Fig. 1, upon a high pressure build-up within the chamber 11, below the piston 10, the material of the die or cylinder 12 generally fails along the line 17. This type of failure occurs regardless of the diameter of the die or cylinder 12. Failures is attributed to the Poisson effect where the pressure exerted against the walls 18 of chamber 11 causes a bulging along the surface 19. The tensile stress developed, indicated by arrows 20, causes tensile failure along line 17. High pressure build-up in chamber 11 of Fig. 1 also causes a die to fail from radial stresses or hoop tension. This is illustrated in Fig. 3 by die 12 with a chamber 11 therein, the line 21 indicating the fracture of the die under high tensile forces or hoop stresses.

To increase their strength, the material of punches employed in this invention is chosen from the highest strength metal or material available, such as hardened die steels, or as in a preferred form of this invention, cemented tungsten carbide, such as one of the Carboloy cemented carbides. One commercially obtainable grade of Carboloy cemented carbide, 44A, employed in this invention comprises 94% tungsten carbide and 6% cobalt. A more complete description of this material may be found in the publication, "Properties of Carboloy Cemented Carbides," April 2, 1951, prepared by Carboloy Department, General Electric Company, Detroit, Michigan. In addition to the choice of high strength materials, the strength of punches may be further increased, in accordance with the above discussion of stresses, by increasing the size of the punch where failure is likely to occur.

In the preferred embodiment of my invention illustrated in Fig. 4, the various dimensions are drawn to scale to facilitate construction of the apparatus by a person skilled in the art. This apparatus comprises generally two opposed punch assemblies 29, 29' between whose faces 22 are placed a reaction vessel 36, and a pressure resisting die assembly 42 surrounding the reaction vessel. Extrusion of the reaction vessel is prevented by composite gasket assemblies 43 positioned to surround the reaction vessel and to act as a seal between punch assemblies 29, 29' and pressure resisting die 42.

In Fig. 4 in which the diameter of area 22 is 0.35 inch, there is shown a pair of Carboloy cemented carbide cylindrical punches 23 and 23', a description of punch 23 sufficing for punch 23'. Punch 23 has a generally narrowing tapered portion 24, the taper of which is a smooth diametrical increase from the pressure area or surface 22 axially along the length of the punch to a given larger area 25. Punch 23 has a substantially cylindrical or base portion 26 of approximately 1.5 inch in diameter, a smaller frustro-conical portion 27 having a wide range of angles, and in one form an angle of 30° to the vertical and extending about ¼ inch, and an intermediate flared curve portion 28 providing a smooth and continuous surface from area 22 to area 25. The result desired is to provide an increasing amount of metal in adjacent cross-sections of punch 23 while subjecting each cross-section to the same total force as is imposed on area 22. Best results are obtained when the axial distance between areas 22 and 25 is kept to a minimum, this dimension being approximately 0.475 inch in the illustrated embodiment of the invention. Another principle employed to enable the punch 23 to resist fracture is pre-stressing. In Fig. 4 punch 23 is pre-stressed by being mounted concentrically within a plurality of metal cylindrical or annular backing or binding rings which may be assembled by the well known method of press-fitting or shrink-fitting. For example, the punch assembly 29 consists of a punch 23, two hardened alloy steel press-fitted backing rings 30 and 31, of approximately 3.9 and 5.5 inches outside diameters respectively, and an outer soft steel guard ring 32 of approximately 6 inches outside diameter. In assembly, the outer soft steel guard ring 32 is first slipped over its mating steel ring 31, and inner steel ring 30 is then pressed into place, followed by punch 23. Interference and proper stressing is supplied by providing a taper and interference on each of the mating surfaces. In one preferred form of this invention, rings 30 and 31 are commercially available AISI 4142 alloy steel comprising carbon 0.4–0.5, manganese 0.75–1, phosphorus 0.04, sulfur 0.04, silicon 0.2–0.35, chromium 0.8–1.1, molybdenum 0.15–0.25 (percentages by weight). When the above-mentioned binding rings are employed together with a Carboloy cemented carbide punch, an interference of approximately 0.01 inch is desirable between punch 23 and ring 30 together with a diametrical taper on the punch of approximately 0.03 inch per inch of length. Ring 30 is hardened to 50 RC on the standard Rockwell C scale. Between the outer surface of ring 30 and the bore of ring 31 an interference fit of approximately 0.03 inch together with a taper of approximately 0.04 inch per inch of length is employed. Ring 31 is hardened to 40 RC on the standard Rockwell C scale. Ring 32, being merely a safety ring, does not necessarily require an interference or taper of any appreciable magnitude. The principal function of the binding rings is to provide sufficient radially inward compressive force on punch 17 to oppose the radially outward force developed within the punch and prevent the punch from fracturing at high pressures. The vertical dimension of punch assembly 29 includes a taper of about 7° with the horizontal, commencing from and including the flared portion 28 of punch 23 so that the assembly height decreases as one proceeds radially from its center. In considering the role of the backing rings in supporting the punch, it is important to recognize the desirability of minimizing plastic flow occurring with each application of load. Rings 30, 31 contribute to produce greater force withstanding conditions in the punch. Obviously, the number, size, material, and fit of the rings and punch may be varied considerably from the dimension given, due consideration always being given to the forces and pressures to be withstood.

While the punch assembly described may be employed to press upon a flat surface, or upon a thin sample placed between the punch and a flat surface, it is to be understood that the utility thereof by itself to obtain high pressure and high temperature is severely limited because the sample extrudes outwardly from beneath the punch under pressure and the punch or punch material weakens considerably under high temperature conditions.

Punches 23, 23' are employed in conjunction with a lateral pressure resisting member or die assembly 42, comprising a die 33 having a central opening or aperture therein provided with a wall surface 35 generally describing a narrowing tapered or convergent divergent die chamber 34 into which punches 23, 23' may move or progress to compress a specimen or material, for example the reaction vessel 36 illustrated in Fig. 5. This combination of tapered punches and tapered die chamber contributes to the strength of both the punches and the die. With respect to each punch, it is to be noted that, whereas in Fig. 1 only one face of cylindrical punch 10 opposes the compressive force, in the tapered punch 23 of Fig. 4, such force is resisted not only by one face of the punch, such as 22, but also by the tapered surface 24. Therefore, the tapered punch is, in effect, being compressed and constricted, and the strength thereof utilized more effectively. At the same time, as will be pointed out later, the force of punch 23 is transmitted to tapered surface 35 of chamber 34 of die 33. Again, whereas in Fig. 1 the forces exerted are purely lateral against vertical wall 18 of chamber 11, in Fig. 4 these forces are not only lateral or horizontal, but progress from purely horizontal at the horizontal centerline of chamber 34 to a combination of horizontal and vertical proceeding along the taper of wall 35. The particular combination of tapering surfaces 24 and 35 may be described as contributing to a force resolving effect, that is, they resolve the substantially solely vertical forces, such as imposed on cylindrical punch 10 in Fig. 1, to a combination of horizontal and vertical forces on punch 23 of Fig. 4.

In order to minimize failures, die 33 of Fig. 4, whose outside diameter is approximately 2.4 inches, is also made of high strength material such as Carboloy cemented carbide Grade 44A as described with relation to punch 23. Pre-stressing of die 33 may also be achieved in the same manner as the pre-stressing of punch 23. Wall 35 of chamber 34 is preferably pre-stressed to its limit of hoop compression. Binding rings 37 and 38, of approximately 4.8 and 6.4 inches outside diameter respectively, are preferably of the same materials respectively as rings 30 and 31, while ring 39, having an outside diameter of 6 inches, is preferably of low carbon steel similar to ring 32. Binding rings 37, 38, and similarly rings 30 and 31, are designed to operate between the highest compressive and the highest tensile stresses possible without incurring excessive danger of fracture due to brittleness. The binding rings are generally pre-stressed by making each ring with a slight taper about 0.040 inch per inch of axial length and of such diameter that the inner ring must be forced into the outer. For example, the interference between ring 37 and ring 38 should be about 0.75% and the interference between ring 37 and die 33 should be about 1.2%. Large press forces are normally required to drive these pieces into place. Obviously, because of the dangerous amounts of energy stored in the binding rings, such assembly operation should not be performed until the outer low carbon steel guard ring 39 is in place. The binding rings and die 33 increase in height radially to provide approximately a 7° taper with the horizontal, which in turn serves to provide an increasing cross-section of material for the imposed stress in the same manner as the taper of the punches.

It has heretofore been described with relation to punch 23 how a vertical force is resolved into horizontal and vertical components by the tapered surface 24. The tapered or converging wall surface 35 of chamber 34 provides a similar resolution of forces in die 33. For example, binding rings 37, 38 prevent radial fracture as illustrated in Fig. 3. To prevent tensile fracture of the type illustrated in Fig. 1, the chamber wall 35 is not subjected solely to a purely lateral force, for the combination of the punch and die configuration resolves the force in die 33 from a purely lateral direction at the horizontal centerline of the chamber 34 and wall 35 to approach a vertical direction at the upper extremity of wall 35. The axial loading transmitted through curved surface 35 places the upper section of wall 35 under axial compressive stresses, and as a reaction to this, a component of hoop compression is generated. The pressure of the contents of chamber 34, such as reaction vessel 36, places the walls under a radial compression equal to the chamber pressure, at the same time producing a large component of hoop tension. The latter is countered by the initial hoop compression due to the pre-stressing plus the induced component of hoop compression caused by the axial loading. These combined forces act to compress the material in the ring in opposition to tensile forces of the type illustrated by the arrows 20 in Fig. 1 and arrows 21' in Fig. 3.

In the embodiment of Fig. 4 wall 35 is defined by a pair of frustro-conical sections 40 and 40' meeting at the horizontal centerline of die 33 with an opening on the centerline of approximately 0.4 inch. The frustro-conical sections make an angle of 11° to the vertical extending about ¼ of an inch. Smooth, flared or curved portions 41 and 41' provide a continuous surface to join the frustro-conical sections 40 and 40' with the previously described 7° taper which commences at die 33.

While the foregoing has described only one punch assembly 29, punch assembly 29' is similar in all respects to assembly 29. Assemblies 29 and 29' are coaxially mounted in opposition to each other as illustrated in Fig. 4. The pressure resisting member or die assembly 42 is located coaxially between the punch assemblies to define a chamber therewith into which reaction vessel 36 is placed. This arrangement is generally referred to as a double-ended apparatus where one or both punch assemblies may be movable toward the other to develop high pressures in the reaction vessel. Simultaneously, high temperatures may be generated in the reaction vessel 36 by methods hereinafter described.

While some of the members of punch assemblies 29, 29' and die assembly 42 have previously been described as in a pre-stressed condition, it should be understood that pre-stressing is employed solely as a means for overcoming short-comings in the strength of the materials of which these pre-stressed components are formed. It should be understood further that pre-stressing may be eliminated when the added force capacity provided by pre-stressing is not required or whenever materials having higher tensile and compressive strengths are available.

The combination and cooperative relationship of the taper 24 of punch 23 and the tapered die surface 35 has been illustrated and described as an apparatus which greatly increases the ability of the apparatus to withstand high temperatures and high pressures. However, the particular combination of a tapered punch and a tapered opening above cannot provide high pressures, since the high pressure developed on any material within the die chamber 34 depends upon the stroke of the punch, or the ability of the punch to compress material within the chamber. Therefore, some provision must be made to provide a stroke for punches 23 and 23', i.e., to permit the punches, or one of them, to move within the chamber 34 to compress a reaction vessel 36 or specimen therein. The simplest method of accomplishing this objective is to place an elastic or deformable gasket between the opposed tapered surfaces of die 33 and punches 23 and 23'.

The choice of a gasket material requires consideration of many and diverse problems. The highly stressed walls of the pressure chamber must be thermally protected from the hot reaction zone by material which will hold the reactants in place physically and chemically, and which will simultaneously transmit pressure to the reactants. The gasket serves three additional functions; first, sealing in the contents of the chamber; second, allowing a rather large movement of the punch relative to the die; and third, providing electrical insulation between the die and the punches when resistance heating is employed. Again, while a large stroke is required for the punch to generate high pressures, a large stroke also permits a large deformation of the gasket structure to take place. Finally, to be successful, the gasket must hold firmly throughout all phases of the cycle, i.e., during loading, holding, high temperature application, and unloading.

Among materials having these general properties are certain ceramics or stones, for example, wondersone (a homogeneous pyrophyllite stone). Minnesota pipestone (catlinite) also has satisfactory physical and chemical properties, but often may not be sufficiently homogeneous to withstand machining to the required shapes and sizes without cracking or crumbling. Experience with high pressures has shown that successful sealing requires a careful division of the press load between the punch face and the gasket. Any ceramic or stone gasket must have the property of gripping the surfaces of the punch and die, and yet be capable of undergoing large plastic shear distortions without losing shear strength. The shear strength of the material should be great enough to prevent gasket blow-out during all parts of the operation cycle, yet not resist movement of the punch excessively. The force imposed upon the gasket structure is not uniform, but varies from a maximum adjacent the innermost edge of the frustro-conical portion of the punch to a minimum at the outer extremity adjacent the flared portion 28.

There is also provided a metal gasket as the center element of a composite gasket sandwich structure to impart toughness and ductility to the gasket structure as a whole. A mild steel, dry hydrogen annealed to substantially maximum softness, is a preferred material for such a metal gasket. When the metal gasket is omitted, the thick section of the stone tends to crack away in large chunks during the initial part of the compression stroke. In addition, a metal which has the correct properties of drawing out uniformly without tearing, while work hardening in so doing, adds considerably to the confining strength of the gasket structure. It is to be understood, however, that when a relatively short stroke is desired, the metal gasket and one associated stone gasket may be omitted, thus leaving a single conical stone gasket.

The central portion of Fig. 4 gives an exploded view of the sandwich type frustro-conical gasket assembly 43 which surrounds tapered surface 24 of punch 23 and comprises a pair of thermally and electrically insulating, pressure resistant frustro-conical ceramic or stone gaskets 44 and 45 with a metallic frustro-conical gasket 46 between adjacent gaskets 44 and 45. The outer gasket 45 tapers inwardly to conform, on its exterior surface, with the tapered surface 35. While only a pair of gaskets 44 and 45 with a separating gasket 46 is illustrated in the drawing, it is to be noted that a plurality of alternate gaskets 44 and 46 further increases the size of the chamber 34, the permissible motion of a punch 23, and the ultimate pressure. However, relatively high pressures are obtained when inner gasket 44 and metallic washer 46 are eliminated. Whereas in Fig. 4 the thickness of washers 44 and 46 have been enlarged for the sake of clarity, in one apparatus embodying the invention the wall thickness of gasket 46 is approximately 0.010 and the wall thickness of washer 44, is about 0.030. Preferably, in gasket 44 larger opening is approximately 0.60 inch in diameter and smaller opening 0.350 inch in diameter. The slant height of gasket 44 is approximately ¼ inch and its conical angle 30° from the vertical to correspond with the frustro-conical portions 27 and 27' of punches 23 and 23'. Similar dimensions where applicable are employed for metal gasket 46 arranged coaxially with gasket 44. Outer gasket 45 is constructed so that its outer surface lies along part of the curve 41 of die wall 35 and along the full extent of frustro-conical portion 40 of die wall 35. The inner surface comprises a cylindrical portion 47 of about 0.350 inch internal diameter and 0.40 inch outside diameter at surface 49 and a frustro-conical upper portion 48 which commences at the internal diameter of portion 47 at an angle of 30° to coincide with gaskets 44, 46 and punch surface 27, to an upper larger internal diameter of 0.60 inch. The height of the cylindrical portion is about 0.212 inch and the overall height of gasket 45 is about 0.430 inch.

Not only does gasket 45 serve to electrically insulate the punch from the die, but also the gaskets 45 on punches 23 and 23' meet in abutting relationship in chamber 34 to provide a liner or insulator for the chamber.

Although a specific size, shape, and composition of gasket assembly 43 has been described above, it is obvious that any gasket assembly meeting the requirements listed above may be employed.

One form of reaction vessel 36 is illustrated in Figure 5, where the various dimensions are drawn to scale and where the vertical distance between punch faces 22 is 0.62 inch. Reaction vessel 36 is positioned in chamber 34 between punches 23 and 23' and includes a pair of spaced electrically conductive discs 50 with a hollow electrically conductive tube 51 therebetween adapted to contain specimen 52 to be subjected to high temperature high pressure conditions. Discs 50 may be of a metal such as nickel or tantalum and are approximately 0.010 inch thick. The primary purpose of tube 51 is to provide a path for electrical current when resistance heating of a non-conductive specimen is employed. In one form of this invention, tube 51 is nickel, approximately 0.4 inch in height, and has an outside diameter of 0.125 inch, and a wall thickness of 0.02 inch. The wall thickness may vary depending on the material used and the resistance required. Alternatively, when specimen 52 is electrically conductive, tube 51 may be omitted. A cylinder 53 of a height of about 0.4 inch and of electrically insulating material such as pyrophyllite or catlinite (see description for gaskets 44 and 45) is positioned around tube 51 between discs 50. If desired, reaction vessel 36 may be in the form of a hollow casing which is in electrical contact with punches 23 and 23', but which is thermally and electrically insulated from walls 35 of aperture 34, for example, by gasket 45. A washer assembly 54, is positioned between each punch 23 or 23' and its associated disc 50 and comprises a heat insulating core 56, approximately 0.10 inch thick, with a surrounding outer electrically conductive ring 55 in electrical contact with the punches 23 and 23', to complete the reaction vessel. Rings 55 are preferably of a hard steel of about 50 Rockwell on the standard C scale and are about 0.25 inch internal diameter. Rings 55 together with discs 56 provide a cap assembly for the reaction vessel 36, which, while thermally insulating the centers of the punch faces, provides a current path to tube 51.

High temperature high pressure apparatus employing the punch and die assembly of Fig. 4 is shown in Fig. 6, in which a hydraulic press 60 of approximately 450-ton capacity comprises a base 61 with a press bed 62 on which is mounted a plurality of vertical shafts 63 to support a carriage 64 with a hydraulic shaft 65. A pair of opposed pistons 66 and 67 on bed 62 and carriage 64 are recessed to partially position punch assemblies 29 and 29' therein. Each assembly is provided with an electrical connection in the form of an annular conducting ring 68 or 68' with connectors 69 and 69', to supply electric current from a source of electrical power (not shown) through punch assemblies 29 and 29', to high temperature high pressure reaction vessel 36. A layer of electrical insulation 70 such as, for example, laminated phenol formaldehyde resin impregnated paper is provided between at least one punch assembly 29' and its associated piston 67 to prevent short circuiting of the reaction vessel by the press. The lateral pressure resisting die assembly 42 is positioned between opposed punch assemblies 29 and 29'. Pressure is applied to the vessel 36 by shaft 65 of the press 60 acting through punch assembly 29. At the same time, electric current is supplied from one electrical connector, such as upper connector 69 to upper conducting ring 68 to the punch assembly 29. Referring now to Fig. 5, the current flows from punch 23 to ring 55, disc 50 and the tube 51 where heating of tube 51 is utilized to heat specimen 52. The current path continues from tube 51 to lower disc 50, ring 55 and punch 23'. Referring again to Fig. 4, the current path continues through punch assembly 29', conductor ring 68' and connector 69' to the electrical source (not shown). Pressures in excess of 95,000 atmospheres and temperatures higher than 2000° C. have been maintained in such apparatus for periods of hours. Also, when desired, a cooling fluid such as air may be passed between opposed punch assemblies 29 and 29' and pressure resisting die assembly 42 to prolong the time period in which high temperatures may be maintained without material damage to the parts. If it is desired, reaction vessel 36 also may be subjected to high pressures alone.

Many variations from the preferred form of this invention are evident. For example, Fig. 7, which illustrates a modification referred to as a single-ended apparatus, employs a single punch assembly 70 similar in both function and structure to punch assembly 29 of Fig. 4. Die assembly 72 is also similar functionally to the upper half of die assembly 42 of Fig. 4. The principal difference between die assembly 72 and that previously described is that die 74 contains a single chamber 75 or more specifically a closed bottom chamber in which a reaction vessel may be positioned. Current is conducted through the reaction vessel in the same manner as described with relation to Figs. 5 and 6 with the current path including die 72. This modification eliminates one punch assembly and its associated gasket structure and requires movement of only one punch. In so doing it not only limits the volume of a material which can be compressed at one time, but also introduces problems of removing compressed material from the die chamber 75.

The embodiment of Fig. 4 has been employed to accomplish the transformation of carbonaceous materials to diamond repeatedly without failure. In producing diamond from carbonaceous materials in the apparatus illustrated in Fig. 4, it is difficult to measure the pressure and temperature to which the carbonaceous materials are subjected by direct means because of the extreme pressures employed. Therefore, each of these conditions may be measured by indirect means. Pressures have been measured in this invention by utilizing the fact that certain metals undergo distinct changes in electrical resistance at particular pressures. For example, bismuth undergoes a phase change which results in a change of electrical resistance at 24,800 atmospheres, thallium undergoes such a phase change at 43,500 atmospheres, cesium undergoes such a change at 53,500 atmospheres, and barium undergoes such a change at 77,400 atmospheres. It is also known that the melting point of germanium varies directly with pressure over an extremely wide pressure range, including pressures up to approximately 180,000 atmospheres, and that the electrical resistance of germanium undergoes a marked change in the transition of germanium from the liquid to the solid phase. Thus, by determining the hydraulic press load necessary to cause a phase change in a metal such as bismuth, a point on a pressure-press load curve was determined. By inserting germanium in the reaction vessel 36, applying the same press load that obtained the phase change in bismuth, and heating the germanium to the temperature at which the germanium melts, as measured by a large decrease in electrical resistivity, a point on a pressure-melting point curve for germanium was determined. This same operation was carried on with the other metals mentioned, thallium, cesium, and barium, whose phase change points were known, and a series of points on a melting point pressure curve for germanium was obtained. This melting point-pressure curve approximates a straight line. Other press loads were applied with the hydraulic press apparatus as illustrated in Fig. 6, when the reaction vessel 36 contained germanium, and melting points of germanium at the different press loads were determined. Accordingly the actual pressure in the reaction vessel 36 at a given press load was also determined.

The results of this pressure calibration are given in Figs. 8 and 9, the former illustrating a pressure vs. press load curve for the above-mentioned metals transitions, and the latter indicating the melting point of germanium as a function of pressure.

The temperature in the reaction vessel is determined by fairly conventional means such as by placing a thermocouple junction in the reaction vessel and measuring the temperature of the junction in the usual manner. We have found that one suitable method of positioning a thermocouple in the apparatus for the measurement of temperature is to run a pair of thermocouple wires through slots or holes in outer pyrophyllite gasket 45. These wires then pass through the joint between upper and lower gaskets 45 and through holes drilled in cylinder 53 of reaction vessel 36 with the thermocouple junction being positioned inside of reaction vessel 36. When a graphite tube 51 is employed, the thermocouple also passes through a hole drilled through this tube. The material to be subjected to the elevated pressure and temperature is then compacted into the cylindrical aperture defined by cylinder 53 or tube 51 and the apparatus is assembled and subjected to a high pressure, such as a pressure of 20,000 to 100,000 atmospheres. Electrical energy at a predetermined rate is then supplied to the apparatus and the temperature produced by this power is measured by the thermocouple assembly. This same procedure is repeated a number of times with different power inputs to produce a calibration curve of power. Temperatures were also measured in reaction vessel 36 by measuring the resistance of heating coils such as platinum heating coils wound around the reaction vessel 36.

The following is a specific example of the transformation of carbonaceous material to diamond as carried on in apparatus similar to that of Fig. 6, with the exception that metal tube 51 was replaced by a graphite tube having a wall thickness of 0.0225 inch.

EXAMPLE 1

The cylindrical graphite tube described above was filled with 5 parts powdered graphite, 1 part powder iron, ⅓ part manganese, and ⅓ part of vanadium pentoxide. The cylindrical tube was sealed with a graphite end plug at the top and was inserted in the cylinder 53 of the reaction vessel 36 of Fig. 5. The material being electrically conductive, metallic tube 51 was unnecessary. Discs 50 were tantalum. The press 60 of Fig. 6 was operated to produce a pressure of approximately 95,000 atmospheres within the material at a temperature of about 1700° C. for about 2 minutes. The material was then cooled to about 1500° C. in eight additional minutes. This resulted in formation of a plurality of diamonds having a great variety of octahedral faces and corners. These diamonds were separated from the matrix on which they were formed by solution of the matrix in fuming red nitric acid. X-ray diffraction patterns obtained from diamonds prepared in this experiment by taking a Debye-Scherrer photograph in a cylindrical camera of 5 centimeters radius with a $CuK_a$ radiation showed overwhelmingly that diamonds had been formed. The interplanar spacings (d in Angstrom units) measured from these photographs are compared with the theoretical value for diamonds in the table below.

*Interplanar spacing (d in Angstrom units)*

| Plane | Measured | Theoretical |
|---|---|---|
| 111 | 2.05 | 2.060 |
| 220 | 1.26 | 1.262 |
| 311 | 1.07 | 1.076 |
| 400 | 0.89 | 0.920 |
| 331 | 0.82 | 0.8185 |

The refractive indices of the number of diamonds formed in this example were measured in white light and found to be in the range of 2.40 to 2.50. The refractive index of natural diamond chips, examined simultaneously, also lay in the range of 2.40 to 2.50. Several samples of diamonds prepared in this example were analyzed for carbon by microcombustion. The results were 86 percent carbon and 81 percent carbon in two runs. Iron, aluminum, silicon, manganese, and vanadium were present in both residues and one residue also contained a trace of tantalum. This compares with natural diamonds which are carbon crystals of varying purity and may contain up to 20 percent ash consisting mainly of oxides of silicon, iron, calcium, magnesium, aluminum and titanium. The diamonds prepared in this example were found to scratch polished boron carbide plate. While specific embodiments of this invention have been shown and described, it is not contemplated that the invention be limited to the particular constructions as shown and described for it is intended by the appended claims to cover all modifications within the spirit and scope of this invention.

What I claim as new and desire to secure by Letters Patent of the United States is:

1. In a high pressure apparatus, a pair of opposed punches, each of siad punches being tapered toward one end, means for exerting pressure on said punches whereby an object positioned between the tapered ends of said punches is subjected to high pressure, a lateral pressure resisting member surrounding said object, said member having a tapered surface adjacent tapered surfaces of said punches, and a thermally and electrically insulating gasket between and adjacent the tapered surfaces of the said punches and the tapered surface of the said lateral pressure resisting member.

2. In a high pressure apparatus, a pair of opposed punches, each of said punches being tapered toward one end, means for exerting pressure on said punches whereby an object positioned between the tapered ends of said punches is subjected to high pressure, a lateral pressure resisting member surrounding said object, said member having a tapered surface adjacent tapered surfaces of said punches, a thermally and electrically insulating gasket between and adjacent the tapered surfaces of the said punches and the tapered surface of the said lateral pressure resisting member and means for passing an electrical current through one of said punches, said object, and the other of said punches.

3. The invention as claimed in claim 1 wherein said thermally and electrically insulating gaskets comprise a ceramic material.

4. The invention as claimed in claim 1 wherein said thermally and electrically insulating gaskets comprise a stone material.

5. The invention as claimed in claim 1 wherein the said thermally and electrically insulating gaskets comprise on each punch, a pair of stone gaskets with an intermediate gasket of soft metal.

6. A high pressure high temperature apparatus comprising in combination, a punch having a convergent portion thereon, a die having a convergent wall portion adapted to receive the convergent portion of said punch, said die and punch defining a reaction chamber for receiving an object to be subjected to high pressures and high temperatures, means to provide relative motion between said punch and said die to compress said object, and a sealing gasket between and adjacent the convergent portion of said punch and said convergent wall.

7. A high pressure high temperature apparatus comprising in combination, a punch having a narrowing tapered portion thereon, a die having a narrowing tapered wall, said narrowing tapered portion and said wall defining a reaction chamber for an object to be subjected to high pressures and high temperatures, means to provide relative motion between said punch and said die to compress said object, and a tapered sealing gasket between and adjacent said tapered portion and said tapered wall.

8. A high pressure high temperature apparatus comprising in combination, a die having a narrowing frustoconical wall chamber therein, a punch having a narrowing tapered end providing a frustoconical end portion thereon, said punch and die defining a reaction chamber for an object to be subjected to high pressures and high temperatures, means to provide relative motion between said punch and said die to compress said object, and a sealing and insulating gasket between and adjacent the frustoconical portions of said punch and chamber.

9. A high pressure high temperature apparatus comprising in combination, a pair of opposed punches having narrowing tapered opposed end portions, an annular die having a convergent divergent aperture therethrough adapted to have an object therein to be subjected to high pressures and high temperatures, said die being coaxially positioned between said opposing punches, means to move one of said punches for the tapered portion thereof to progress into said aperture, and a tapered sealing and insulating gasket adjacent said tapered surfaces of said punches and the surface of said aperture.

10. The invention as claimed in claim 1 wherein said object is a reaction vessel which includes a thermal and electrical insulating cylinder, an electrically conductive metal disc concentrically adjacent each end of said insulating cylinder and a cap assembly concentrically adjacent each disc, said cap assembly comprising an electrically conductive annular metallic ring and an insulating disc surrounded by said ring.

11. A high pressure, high temperature apparatus comprising in combination, a pair of opposed punches having narrowing tapered opposed end portions thereon, an annular die having a convergent divergent aperture therethrough, said die being coaxially positioned between said opposed punches, means to move one of said punches for the tapered end to progress into said aperture, a tapered gasket structure between said punches and said annular die, said structure including a stone gasket adjacent the tapered end portions of said punches, a soft metal gasket adjacent said stone gaskets and a further stone gasket adjacent said metal gasket, a reaction vessel within said aperture, said reaction vessel comprising a stone cylinder, an electrically conductive disc concentrically adjacent each end of said cylinder, and a cap assembly concentrically adjacent each disc and punch, the cap assembly including a hard metal ring and a stone disc encircled by said ring, and means to conduct electrical current through one of said punches to said reaction vessel.

References Cited in the file of this patent

UNITED STATES PATENTS

| 163,232 | Neupert | May 11, 1875 |
| 1,112,779 | Forsyth | Oct. 6, 1914 |
| 1,251,578 | Riecken | Jan. 1, 1918 |
| 1,840,472 | Singer | Jan. 12, 1932 |
| 1,891,725 | Payne | Dec. 20, 1932 |
| 2,539,903 | Gruetjen | Jan. 30, 1951 |
| 2,544,414 | Bridgman et al. | Mar. 6, 1951 |
| 2,554,499 | Poulter | May 29, 1951 |
| 2,694,922 | Vilella | Nov. 23, 1954 |

OTHER REFERENCES

Bridgman II: "Journal of Chemical Physics," vol. 15, No. 2 pp. 92–98, Feb. 1947.

Bridgman III: "American Acadamy of Arts and Sciences, Proceedings," vol. 81, No. 4., pp. 169–184, Mar. 1952.

Baur: "Zeithschrift fur Anorganische Chemie," vol. 92 pp. 357–372 (1943).

Parsons: "Phil. Trans. of the Royal Society," vol. 220, pp. 67–71, 1919, Series A.

Neuhaus: "Angewandte Chemie," vol. 66, pp. 525–536, Sept. 7, 1954.

Kuss: "Chemie Ingenieur Technick," vol. 28, No. 3, pp. 141–152, Mar. 1956.

Bridgman IV: "Am. Acad. of Arts and Sciences, Proceedings," vol. 74, No. 3, pp. 21–30, Oct. 1940.

Bridgman V: "Review of Modern Physics," vol. 18, No. 1 pp. 1–9, 19–27, 32–38, 49–55, 62–68, 79–88, Jan. 1946.